Figure 1:
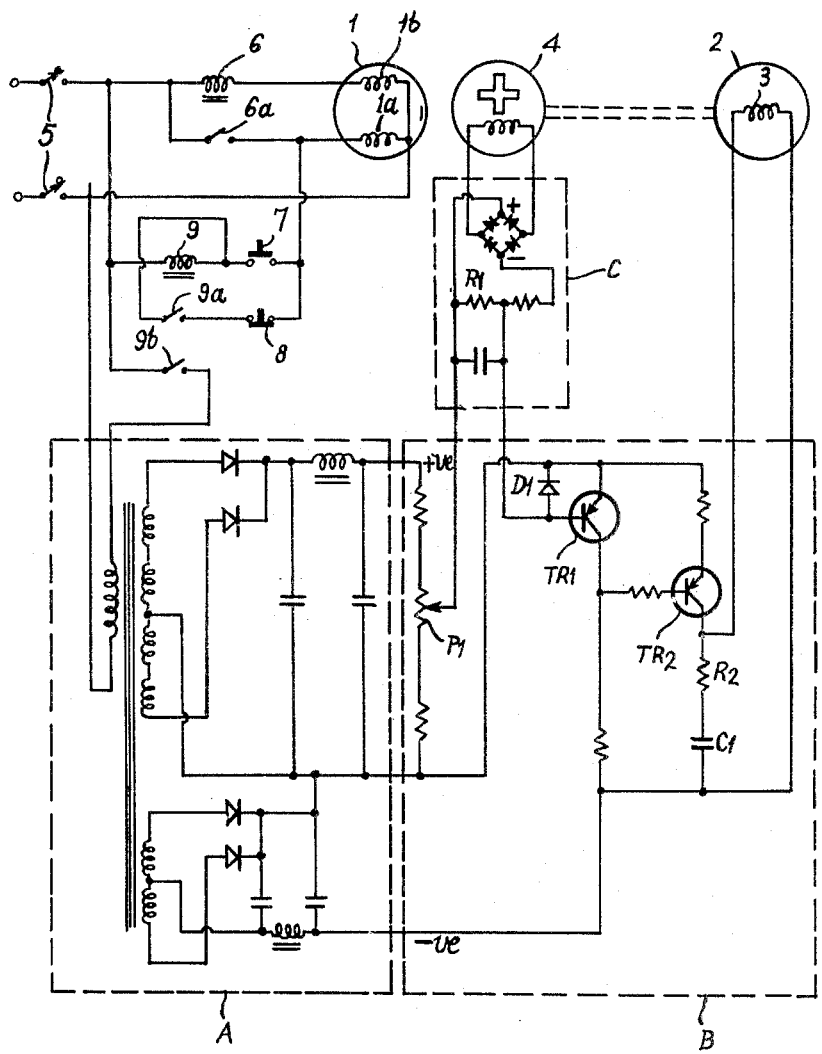

United States Patent Office 3,173,041
Patented Mar. 9, 1965

3,173,041
CONTROL CIRCUIT FOR ELECTROMAGNETIC COUPLINGS
Norman R. Bancroft, Cambridge, England, assignor to Pye Limited, Cambridge, England, a company of Great Britain
Filed Jan. 15, 1960, Ser. No. 2,627
5 Claims. (Cl. 310—95)

The present invention relates to a control circuit for electromagnetic coupling devices, such as induction coupling devices.

From one aspect the invention provides a speed control circuit for an electromagnetic coupling device wherein the output shaft of the coupling device drives a feedback generator which produces an output varying as a function of the output shaft speed and which is applied as a correction signal to the control circuit to maintain a desired speed of rotation of the coupling, said control circuit including a potentiometer fed with a D.C. voltage and which is set to a value representing the desired speed and a transistor the base potential of which is controlled both by the D.C. potential derived from the speed control potentiometer and by a D.C. potential derived from the feedback generator, the transistor controlling the energisation of the exciter coil of the coupling device and the arrangement being such that the current fed to the exciter coil of the coupling is highest for the lowest values of collector current of the transistor whereby the transistor operates to give maximum sensitivity to the control circuit.

The electromagnetic coupling devices may be driven by a split phase, single phase A.C. motor. When bringing the arrangement into operation, a start switch is closed to connect the A.C. supply to the run winding of the motor via the operating coil of a motor start relay. The heavy surge starting current of the motor energises the start relay coil which closes the relay contact to energise the motor start winding. When the motor has almost run up to speed the start relay contact opens to switch out the motor start winding, which subsequently remains disconnected. In order to reduce starting torque it is necessary to keep the exciter coil of the coupling non-energised during the motor run-up time.

According to another aspect of the invention therefore, in order to reduce starting torque during the motor run-up time a coupling start switch is provided in conjunction with a load relay, the arrangement being such that closing of the start switch will only energise the load relay and hence the exciter coil of the coupling if the contact of the motor start relay is open. The load relay coil is connected in series with the start winding of the motor and the coupling start switch and hence is maintained energised via the motor start winding. If the motor start winding is reconnected to the supply through the contact of the motor start relay, due to a supply voltage surge or to a motor overload causing operation of the motor start relay, the load relay becomes de-energised and the exciter coil of the coupling is disconnected. It can be reconnected only by operating the coupling start switch after the motor start relay is released to disconnect the motor start winding.

Such a circuit arrangement provides protection against overload due to a motor fault, no-volt protection, and reduces the starting torque requirements of the motor.

Figure 2:
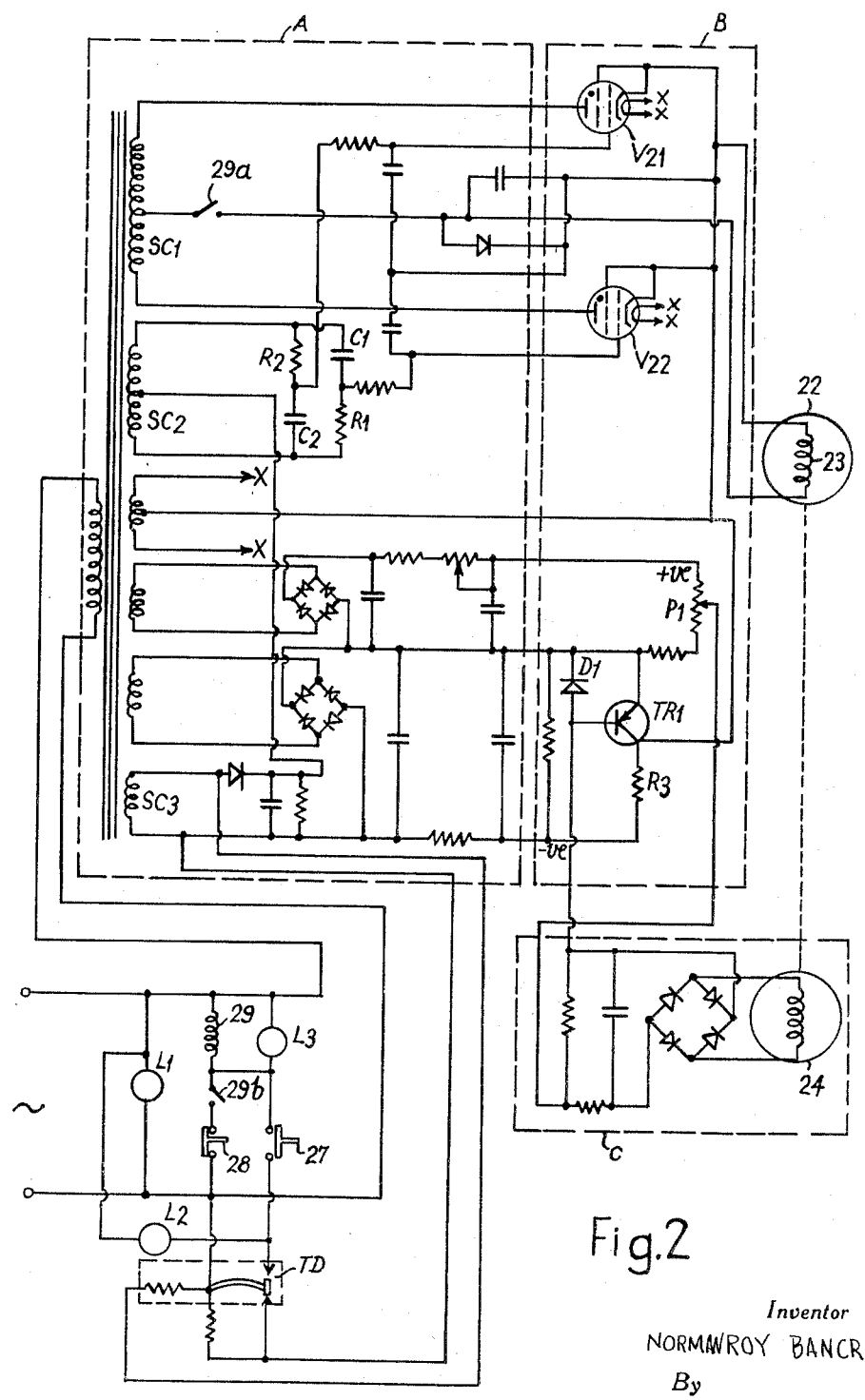

The invention will now be further described with reference to the accompanying drawings, in which:

FIGURE 1 is a circuit diagram of one embodiment of control circuit according to the invention for an induction coupling, which may be constructed as described in my co-pending application No. 826,028, filed July 9, 1959, and FIGURE 2 is a circuit diagram of a further embodiment.

Referring to FIGURE 1, there is shown a split phase motor 1, having a start winding 1a and a run winding 1b, which drives an induction coupling 2, having an exciter coil 3 the output shaft of the coupling carrying an A.C. feedback generator 4 of the permanent magnet type. The motor and coupling are controlled through a motor start switch 5 and a motor start relay 6, a coupling start switch 7, a coupling stop switch 8 and a load relay 9. The circuit also includes a power unit A, an amplifier B, and a rectifier unit C, the operation of which will be described later.

In order to bring the coupling into operation, the motor 1 is run up to speed with the exciter coil 3 of the coupling disconnected. The motor is energised by closing the motor start switch 5, the heavy surge starting current of the motor energising the start relay coil 6 to close relay contact 6a and so energise the motor start winding 1a. When the motor 1 has almost run-up to speed, the start relay contact 6a opens to switch out the motor start winding 1a. If the coupling push-button start switch 7 is now closed, current will flow through the motor start winding 1a and through the switch 7 to energise the load relay coil which is maintained energised via the motor start winding. Contact 9b of the load relay energises the power unit A from the A.C. supply to cause energisation of the exciter coil 3 of the coupling through the amplifier B. A push-button switch 8 is also provided in series with contact 9a to stop the coupling. When switch 8 is operated it de-energises the load relay 9 and hence causes de-energisation of the power unit A, amplifier B and the exciter coil of the coupling 2.

Should the motor start relay 6 become again energised whilst the coupling is running, for example due to a supply voltage surge or a motor overload, the contact 6a will close this effectively shorting out the load relay 9 and so cause the coupling to become disconnected since once again the power unit A and amplifier B as well as the exciter coil 3 are de-energised. The coupling can then only be energised by operating the coupling start switch 7 after the motor start relay 6 has become de-energised and the contact 6a has opened.

This circuit arrangement provides protection against overload due to a motor fault, no-volt protection and reduces the starting torque requirement of the motor.

The operation of the speed control system will now be described. When the load relay 9 is energised the power unit A produces a positive D.C. potential which is fed to the speed control potentiometer P1, the setting of which controls the magnitude of the cut-off potential applied to the base electrode of transistor TR1 through resistor R1. The flow of reverse current is prevented by the diode D1 the potential across which carries the base of TR1 slightly positive with respect to its emitter, to cut-off this transistor. The emitter of TR1 is connected to the negative pole of the D.C. supply to the potentiometer, whilst the collector is connected to a second and more negative supply from power unit A. The base of a second transistor TR2 is connected to the collector of transistor TR1 and the collector of this second transistor is connected to the exciter coil 3 of the coupling 2. When TR1 is cut off, TR2 is fully conducting and the coupling coil fully energised. Resistor R2 and condenser C1 are provided to control transients.

As the output shaft of the coupling runs-up to the speed set on the speed potentiometer, the feedback generator generates a voltage proportional to the speed of the coupling output shaft. This voltage is rectified by the rectifier unit C and a proportion of it is developed across resistor R1 which adds to the voltage from the speed control potentiometer P1. When the output shaft reaches the speed set by the speed control potentiometer, transistor TR1 becomes conducting and the conduction of transistor TR2 reduces to the value necessary for the coupling to develop the torque to overcome the shaft load at that speed.

It will be noted that diode D1 prevents transistor TR1 from conducting due to reverse base current when it should be cut-off. It also conducts when the speed potentiometer is rotated quickly from maximum to minimum and thereby holds the base potential of transistor TR1 to its slightly positive cut-off value.

The coupling can be accelerated by positive action on the control system but its running down speed is controlled by the shaft load because no retarding torque can be generated. Moreover transistor gain is highest at low collector currents and falls off rapidly as the collector current increases.

In the control circuit of FIGURE 2 the driving motor for the coupling is not shown but the induction coupling itself is shown at 22 having an exciter coil 23. The output shaft of the coupling drives an A.C. feedback generator 24 of the permanent magnet type and the energisation of the coupling is controlled through the start switch 27, the stop switch 28 and the load relay 29. As in the previous embodiment the circuit also includes a power unit A, an amplifier B, and a rectifier unit C.

The control circuit consists basically of a transistor amplifier TR1 whose input is the sum of the D.C. voltages supplied by a reference speed potentiometer P1 and the feedback generator 24, through rectifier unit C. The operation of this part of the circuit is similar to that described for the previous embodiment, but instead of providing a second transistor through which the exciter coil is fed, this circuit employs a full-wave thyratron rectifier arrangement, wherein the grid firing angle of the thyratrons V21, V22 is controlled by the transistor output.

In operation, when the mains power is applied lamp L1 lights and all parts of the circuit are energised except the anodes of the thyratron valves through secondary SC1. When the thermal delay switch TD operates (10–15 secs. after power has been applied) lamp L2 lights to indicate that it is now possible to operate the load relay 29 via the start switch 27. In the intervening time the thyratrons have been allowed to warm up. Lamp L3 lights when the start switch is closed.

Operation of the load relay 29 completes the anode circuit of the thyratron valves through contact 29a. Hold-on contact 29b also closes, and the load relay may be released by operation of the stop switch 28.

Considering the thyratron circuit V21 and V22, three different potentials are applied for biasing the grids relative to the cathodes. The first potential is an A.C. bias supplied from secondary SC2 the phase of the sine wave being arranged by C1, R1 and C2, R2 to cause the grid potential of each thyratron to lead 90° on the anode voltage supplied from secondary SC1. When the alternating grid bias voltage curve crosses the critical cathode/grid voltage curve during the positive half-cycle of anode voltage, the thyratrons will fire. Once conduction has been initiated it continues for the rest of the positive half-cycle of anode voltage.

The critical grid voltage is slightly negative with respect to the cathode. If acting alone, the A.C. bias will cause firing from about 80° of the positive half-wave of anode voltage. To apply a control of firing over the whole range, the A.C. grid bias is shifted positive with respect to the cathode to cause firing over the whole positive half-cycle of anode voltage and a control voltage is arranged to act negatively. The standing positive D.C. bias is supplied from secondary SC3 through the associated rectifier and smoothing circuit to the center tap of secondary SC2 and acts between the cathodes and grids of both V21 and V22, and with the A.C. bias will cause these valves to conduct over the whole positive half-cycle of anode voltage.

The control of thyratron firing, and thus the control of D.C. current into the coupling exciter coil 23 is achieved by the voltage developed across the load resistor R3 of transistor TR1. This voltage acts to carry both thyratron grids negative with respect to their cathodes.

Assuming the coupling 22 to be driving a load at a set speed and that the torque required suddenly decreases, then the current to the exciter coil 23 must also decrease so that the reduced value of torque generated will match that now required by the shaft load. However, as the load torque falls, the excess torque generated by the coupling will cause shaft speed to rise, which causes the D.C. output derived from the feedback generator through rectifier unit C to rise which in turn carries the base of transistor TR1 negative with respect to the emitter. The resultant increased conduction between emitter and collector of TR1 raises the voltage developed across its load resistor R3 which acts on the thyratrons V21, V22 to take their grids negative with respect to the cathodes. This in turn delays the firing angle of the thyratrons which reduces the exciter coil current to that required for the generation of the new value of load torque.

The circuit operates in the reverse manner for an increase of load torque.

In the circuits according to the present invention transistor TR1 is operated so that the coupling coil current is highest for the lowest values of the collector current of TR1. This means that the maximum possible gain is derived from the system at all times because the accelerating torque of the coupling is produced during the most sensitive period of operation of transistor TR1.

At low speed settings the coupling gain, specified as the output torque/coil current, is at its highest value and the conduction of transistor TR1 is at a low level for all values of torque up to the rated maximum, giving a high amplifier gain. This results in the speed error of all speeds becoming more proportional to speed than would otherwise be the case.

By arranging transistor TR1 in this mode very rapid accelerations under load are produced whatever the differences between the set speed and actual speed and good regulation is obtained. For example, employing the circuit shown in FIGURE 1 with a ¼ H.P. coupling constructed as described in my afrementioned copending application, for a set speed of twelve hundred r.p.m. the regulation from no load to full load conditions is 15 r.p.m. and for a set speed of 60 r.p.m. the regulation from no load to full load conditions is 5 r.p.m.

With the circuit of FIGURE 2, speed regulation for the output load varying from 0–100% torque are 3% at top speed and 12% at bottom speed with a 20:1 speed range. The percentage variation is a percentage of the speed setting.

Whilst particular embodiments have been described it will be understood that various modifications may be made without departing from the scope of this invention. For example instead of using an A.C. feedback generator and rectifier unit C, a D.C. feedback generator could be employed.

Moreover the circuit can be made to give two or more ranges of speed control by employing a feedback generator with a separately excited field and means for energising the field to different degrees.

I claim:

1. A speed control circuit for an electromagnetic coupling device, comprising an alternating current feedback generator driven from the output shaft of the coupling device and which produces an output varying as a function of the output shaft speed, means for applying the output of said feedback generator to a control circuit to maintain a desired speed of rotation of said coupling, said control circuit including a transistor, a potentiometer fed with a direct current voltage, means for setting an adjustable tapping on said potentiometer to a value representing the desired speed of rotation of said coupling, means for applying the voltage derived from the adjustable tapping as a potential to the base of said transistor, means for rectifying the output from said feedback generator and applying the rectified voltage to the base of said transistor, a full wave thyratron rectifier circuit comprising two thyratron tubes, means for feeding an alternating current potential to the anodes of said thyratron tubes, means for biasing the control grids of the thyratron tubes so that they conduct during the positive half-cycles of anode voltage excursion, means for applying a direct current voltage depending upon the conductance of said transistor as a further bias to the control grids of said thyratron tubes thereby to control the firing instant of the thyratrons and means for energising the exciter coil of said coupling device by the output of said thyratron rectifier circuit, whereby the conductance of said transistor, as determined by the relationship between the voltage derived from the tapping on the potentiometer and the rectified voltage from the feedback generator, controls the energisation of said exciter coil and hence the speed of rotation of said coupling device and said transistor is arranged so that for the lowest values of its conductance the energisation of the exciter coil is highest.

2. A circuit as claimed in claim 1, in which the control grids of the two thyratron tubes are biased from three separate sources, the first bias being an A.C. bias, the second bias being a standing positive bias which with the A.C. bias causes the thyratron tubes to conduct over the whole positive half-cycle of anode voltage and the third bias consisting of the voltage produced from the output of the transistor and controlling the firing of the thyratron tubes and hence the D.C. current in the coupling exciter coil.

3. A circuit as claimed in claim 1, in which a diode device is connected between base and emitter of the transistor to prevent the flow of reverse current through said transistor.

4. A speed control circuit for an electromagnetic coupling device, comprising a feedback generator driven from the output shaft of the coupling device and which produces an output varying as a function of the output shaft speed, means for applying the output of said feedback generator to a control circuit to maintain a desired speed of rotation of said coupling, said control circuit including a transistor, a potentiometer fed with a direct current voltage, means for setting an adjustable tapping on said potentiometer to a value representing the desired speed of rotation of said coupling, means for applying the voltage derived from the adjustable tapping as a potential to control the conductance of said transistor, means for applying the output from said feedback generator to control the conductance of said transistor, a full wave thyratron rectifier circuit comprising two thyratron tubes, means for feeding an alternating current potential to the anodes of said thyratron tubes, means for biasing the control grids of the thyratron tubes so that they conduct during the positive half-cycles of anode voltage excursion, means for applying a direct current voltage depending upon the conductance of said transistor as a further bias to the control grids of said thyratron tubes thereby to control the firing instant of the thyratrons and means for energising the exciter coil of said coupling device by the output of said thyratron rectifier circuit, whereby the conductance of said transistor, as determined by the relationship between the voltage derived from the tapping on the potentiometer and the rectified voltage from the feedback generator, controls the energisation of said exciter coil and hence the speed of rotation of said coupling device and said transistor is arranged so that for the lowest values of its conductance the energisation of the exciter coil is highest.

5. A speed control circuit for an electromagnetic coupling device, comprising an alternating current feedback generator driven from the output shaft of the coupling device and which produces an output varying as a function of the output shaft speed, means for applying the output of said feedback generator to a control circuit to maintain a desired speed of rotation of said coupling, said control circuit including a transistor, a potentiometer fed with a direct current voltage, means for setting an adjustable tapping on said potentiometer to a value representing the desired speed of rotation of said coupling, means for applying the voltage derived from the adjustable tapping as a potential to the base of said transistor, means for rectifying the output from said feedback generator and applying the rectified voltage to the base of said transistor a full wave thyratron rectifier circuit comprising two thyratron tubes, means for feeding an alternating current potential to the anodes of said thyratron tubes, means for biasing the control grids of the thyratron tubes so that they conduct during the positive half-cycle of anode voltage excursion, means for applying a direct current voltage depending upon the conductance of said transistor and derived from a load connected in series with the collector of said transistor as a further bias to the control grids of said thyratron tubes thereby to control the firing instant of the thyratrons and means for energising the exciter coil of said coupling device by the direct current output of said thyratron rectifier circuit, whereby the conductance of said transistor, as determined by the relationship between the voltage derived from the tapping on the potentiometer and the rectified voltage from the feedback generator, controls the energisation of said exciter coil and hence the speed of rotation of said coupling device and said transistor is arranged so that for the lowest values of its collector current the energisation of the exciter coil is highest.

References Cited in the file of this patent

UNITED STATES PATENTS

| | | |
|---|---|---|
| 2,449,779 | Jaeschke | Sept. 21, 1948 |
| 2,743,797 | Whitaker | May 1, 1956 |
| 2,788,104 | Mason | Apr. 9, 1957 |
| 2,850,654 | Jaeschke | Sept. 2, 1958 |
| 2,941,638 | Hoover | June 21, 1960 |